June 12, 1962     P. G. CARLSON, JR     3,038,301
MACH NUMBER CONTROL SYSTEM
Filed Oct. 31, 1955
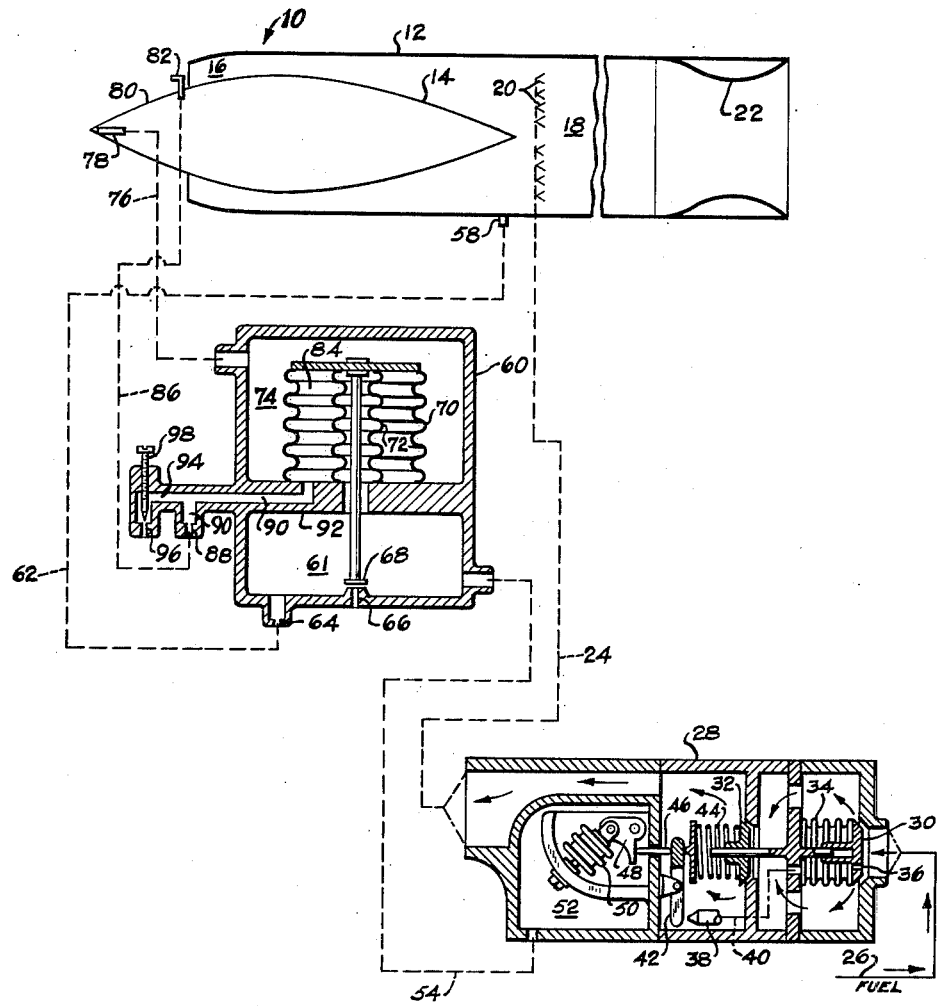
INVENTOR.
PHILLIP G. CARLSON, JR
BY
ATTORNEY

United States Patent Office 3,038,301
Patented June 12, 1962

3,038,301
MACH NUMBER CONTROL SYSTEM
Phillip G. Carlson, Jr., Hackensack, N.J., assignor to Curtiss-Wright Corporation, a corporation of Delaware
Filed Oct. 31, 1955, Ser. No. 543,883
5 Claims. (Cl. 60—35.6)

This invention relates to aircraft engines and is particularly directed to an aircraft engine control system.

The static pressure of the surrounding atmosphere is often used as one of the control variables of an aircraft jet engine control system. Thus, in a system for controlling the flight Mach number of an aircraft in supersonic flight, this static pressure and the impact pressure of the approaching free air stream are commonly combined to provide a measure of said Mach number. At high altitudes, this static pressure becomes quite low. For example at 70,000 feet this pressure is less than 1½ inch of mercury absolute. Hence at high altitudes the control force provided by the static pressure of the surrounding atmosphere is difficult to measure and becomes quite small unless components with large effective areas subjected to this pressure are used. Further in such a Mach number control system small errors of measurement of said static pressure introduce large errors in flight Mach number.

An object of the present invention comprises the provision of novel means for measuring the flight Mach number at supersonic flight speeds. A further object of the invention comprises the provision of novel means for measuring said flight Mach number in which two impact pressures are used to sense changes in said flight Mach number, the one pressure preferably being the impact pressure of the approaching free air stream and the other being the impact pressure measured off an inclined surface, for example as provided by a cone or wedge in the path of said air stream such that said latter impact pressure is also measured at a point at which the air velocity is supersonic during supersonic flight. The ratio of two such pressures has a particular value for each supersonic flight Mach number and the magnitude of this ratio changes substantially with changes in said Mach number whereby said two impact pressures can be used to measure said Mach number and can be used in a system for controlling the flight Mach number. Throughout a wide range of supersonic speeds and even at altitudes of at least 100,000 feet said impact pressures are sufficiently large and different in magnitude to make them readily measurable and to make them usable to measure said flight Mach number and/or to permit their use in a flight Mach number control system.

A further object of the invention comprises the provision of a new and improved system for controlling the flight Mach number of supersonic aircraft. More specifically a further object of the invention comprises the provision of such a flight Mach number control system utilizing the aforementioned impact pressures for measuring said flight Mach number.

Other objects of the invention will become apparent upon reading the annexed detailed description in connection with the drawing which is a schematic view of a ram-jet engine embodying the invention.

The invention has been illustrated in connection with a ram-jet engine. As will be apparent, however, the invention is not so limited.

Referring to the drawing, a ram-jet engine is schematically indicated at 10. As illustrated, the engine 10 comprises a duct-like member 12 within which a centerbody 14 is co-axially mounted. The centerbody 14 is disposed at the forward end of the duct member 12 to provide an annular air inlet passage 16. The duct member 12 has a combustion chamber 18 intermediate its ends, said chamber having flame holder and burner apparatus, schematically indicated at 20 for stabilizing combustion downstream therefrom. Fuel, for combustion with air entering the inlet 16, is supplied to the combustion chamber 18, this fuel being introduced into the duct member 12 at the flame holder and burner apparatus 20, as illustrated, or upstream therefrom. An exhaust nozzle 22 is provided at the rear end of the duct member 12 through which the exhaust gases from the combustion chamber discharge rearwardly into the surrounding atmosphere to provide the engine with forward propulsive thrust. As is conventional, the area of the nozzle 22 may be adjustable.

Fuel is supplied to the burner apparatus 20 through a fuel line 24 from a fuel pressure supply line 26 under control of a fuel regulating device 28 which preferably is similar to that fully disclosed in copending application Serial No. 286,364 filed May 6, 1952. As schematically illustrated in the drawing, the fuel regulating device 28 includes a main valve 30 and an auxiliary valve 32 disposed in series with and downstream of said main valve. The main valve 30 is supported by and is urged in a valve closing direction by an elastically flexible bellows-type diaphragm 34 the interior of which communicates with the upstream side of main valve through a restricted passage 36. A nozzle 38 has its upstream side communicating with the interior of the bellows 34 via a passage 40 such that a small quantity of fuel flows through the restriction 36 and discharges through the nozzle 38 into the fuel passage of the regulator 28 downstream of the auxiliary valve 32. One end of a lever 42 overlies the discharge end of the nozzle 38 to function as a baffle member for said nozzle. A spring 44 is disposed between the lever 42 and the auxiliary valve 32 so as to urge the lever 42 in a nozzle closing direction and to urge the valve 32 in a closing direction against the fuel pressure differential across said valve. The force of the spring 44 on the lever 42 is opposed by a second force transmitted thereagainst by a pin 46 from a lever 48 and bellows-type flexible diaphragm 50. The bellows 50 is disposed in a closed chamber 52 to which a control pressure (Pc) is transmitted by a passage 54.

With this construction of the fuel regulating device 28, if, for example, the control pressure in the chamber 52 acting against the bellows 50 increases, the lever 42 moves away from the nozzle 38 to effect an opening adjustment of said nozzle to increase the leakage fuel flow therethrough. This increase in fuel flow through the nozzle 38 increases the fuel pressure drop across the restriction 36 thereby increasing the valve opening fluid pressure force acting on the main valve 30 against the elasticity of the bellows 34. The main valve 30 thereupon opens to increase the fuel flow until the resulting increase in the fuel pressure differential on the auxiliary valve 32 is such that the increase in the force exerted by said auxiliary valve 32 on the lever 42 through the spring 44 rebalances the forces on the lever 48. In this way, as more fully explained in said copending application, the regulating device 28 regulates the fuel flow therethrough to the combustion chamber 18 in proportion to the magnitude of the control pressure in the fuel regulator chamber 52.

The control pressure Pc in the fuel regulator chamber 52 is obtained from a static pressure tube 58 in the combustion chamber 18 under control of a mechanism 60. The pressure tube 58 preferably is disposed upstream of the flame holder apparatus 20 in said combustion chamber because of the relatively low temperatures in this region. This pressure (Pb) at the entrance to the combustion chamber burner is a measure of the mass rate of air flow through the engine, said pressure being directly proportional to said mass air flow rate for a given fuel-air ratio of the engine combustion mixture with the proportionality constant depending primarily on the magnitude of said fuel-air ratio.

The pressure tube 58 is connected to a chamber 61 in the control mechanism 60 by a passage 62 having a restriction 64. The chamber 61 has a restricted opening 66 under control of a movable valve element 68. The opening 66 bleeds air into the surrounding atmosphere, the flow path of the bleed air being from the pressure tap 58 through the passage 62 and its restriction 64 thence into the chamber 61 and out through the restricted opening 66. Accordingly, for a given position of the valve element 68 the pressure in the chamber 61 is proportional to the pressure $Pb$ supplied thereto from the combustion chamber pressure tap 58 through the restriction 64. The pressure in the chamber 61 is supplied by the passage 54 as the control pressure to the fuel regulator 28. Hence the fuel regulator control pressure $Pc$ is equal to $CPb$ where C is a fraction whose value is constant for each position of the valve element 68. If the pressure drop across the restricted opening 66 is above the critical pressure ratio the magnitude of the fraction C is independent of the changes in the pressure of the surrounding atmosphere into which the opening 66 discharges.

The movable valve element 68 is connected to the movable end of a pair of co-axial bellows-type flexible diaphragms 70 and 72 separating the chamber 61 from a chamber 74. The chamber 74 is connected by a passage 76 to a total head tube 78 disposed at the forward end of the nose of the centerbody 14 whereby the chamber 74 is subjected to a pressure equal to the impact pressure $P1$ of the surrounding free air stream relative to the engine 10, as measured by the total head tube 78. At supersonic flight speeds, this impact pressure $P1$ is substantially less than the total pressure because of shock losses at the entrance to the total head tube 78.

As is conventional, the nose 80 of the centerbody 14 is generally conical with its axis disposed parallel to the free stream direction of the approaching air. With this construction, the conical surface of the centerbody nose 80 is inclined to said free stream direction so that the downstream portion of said conical surface extends into said stream. Hence the air entering the inlet 16 is turned into said free stream direction by the conical surface 80 of the centerbody 14 whereby, at supersonic flight speeds, compression of said entering air is produced by said conical surface.

A second total head tube 82 is disposed adjacent to the conical surface 80 downstream of its leading or upstream end. The impact pressure $P2$ measured by the tube 82 is substantially greater than that measured by the tube 78 since, because of the reduced velocity of the entering air stream at the tube 82, the shock losses at this tube are less.

The total head tube 82 preferably is located at the forward end of the duct member 12 or, as illustrated, upstream therefrom in order that during normal engine operation said tube is always upstream of the inlet normal shock wave marking the transition from supersonic flow of the inlet air to subsonic flow of said air whereby the total head tube 82 is also located at a point where the air velocity is supersonic during supersonic flight.

With a substantially conical nose 80 for the centerbody 14 the impact pressures measured by the total head tubes 78 and 82 are substantially independent of small changes in the angle of attack or yaw of said centerbody to the approaching air. With the total head tube 82 disposed so that a plane including said tube and the axis of the conical nose 80 is vertical then the impact pressure measured by said tube is insensitive to larger changes in the angle of yaw than it is to changes in its angle of attack. On the other hand if said plane is horizontal then the impact pressure measured by said tube 82 is insensitive to larger changes in its angle of attack than it is to changes in its angle of yaw.

It has been found satisfactory to make the nose 80 a right circular cone having a half apex angle of 30 degrees. As will appear, however, the invention is not limited to a conical nose of this angle or even to an inlet having a conical nose such as the nose 80.

The impact pressure $P2$ measured by the total head tube 82 is transmitted to the space 84 between the bellows 70 and 72 via a passage 86 having a restriction 88 and a passage 90 in a partition member 92. A bleed passage 94 provides communication between the passage 90 and the surrounding atmosphere, said bleed passage having a restricted discharge opening 96 controlled by an adjustable valve 98. With this construction, the pressure in the space 84 between the bellows 70 and 72 is equal to $KP2$ where K is a constant the magnitude of which can be adjusted by adjustment of the valve 98.

With the foregoing construction, the position of the valve 68 depends on the ratio of the pressures $P1$ and $KP2$ and this ratio depends on the Mach number of the flight speed of the engine 10 whereby said valve position is a measure of said Mach number. Assume now that the engine is operating at its desired flight speed. If the flight speed should increase, the pressures $P1$ and $P2$ will both increase but $P2$ will increase to a greater extent whereupon the bellows 70 and 72 will raise the valve 68 to provide an opening adjustment of the restricted opening 66 thereby lowering the control pressure $Pc$ to the fuel regulator 28. Since the fuel regulator maintains the fuel flow proportional to the control pressure $Pc$, this opening adjustment of the valve 68 in response to an increase in the flight speed Mach number results in a decrease in the fuel-air ratio of the engine combustion mixture. This in turn results in a decrease in the engine thrust output and a return of the engine flight speed to the desired value. Likewise a decrease in the engine flight speed causes the valve 68 to move in a closing direction thereby increasing the magnitude of the ratio C and causing an increase in the engine fuel-air ratio to increase the engine thrust output.

From the above description it is apparent that the valve 68 of the control mechanism 60 is movable in response to changes in the flight speed Mach number such that the control mechanism 60 provides the fuel regulator 28 with a control pressure $Pc$ which increases and decreases with decrease and increase respectively in the flight Mach number from a desired value. In response to said control pressure the regulator 28 varies the engine thrust output in a direction to restore said Mach number to the desired value by varying the fuel-air ratio of the combustion mixture supplied to the engine combustion chamber 18. Since the position of the control mechanism valve 68 determines the fuel-air ratio of the engine combustion mixture maintained by fuel regulator 28, the limits of the fuel-air ratio are automatically determined by the limiting positions of the valve 68. Hence the system can be designed so that the engine always operates within the desired fuel-air ratio limits.

At any altitude the impact pressures $P1$ and $P2$ at supersonic flight speeds are large compared to the static pressure at said altitude. Hence the control system described makes possible the use of smaller components, such as the bellows, as compared with a system using said static preure as one of the control variables. Also, the control system rescribed obviously is usable throughout a large Mach number range of supersonic flight speeds.

The function of the control system described is to control the flight speed Mach number. In the system described this is accomplished by regulating the net forward thrust by varying the engine fuel-air ratio. Obviously this thrust could also be regulated by varying the area of the exhaust nozzle in response to the control pressure $Pc$. Also, instead of regulating thrust to control the flight speed Mach number, the drag or attitude of the aircraft could be regulated to control the flight speed Mach number in response to said control pressure.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Control apparatus for a supersonic aircraft having means for creating a shock wave during supersonic flight and having a propulsive engine with a combustion chamber and with an air inlet through which air enters for combustion in said chamber; said apparatus comprising means providing a signal which is a measure of the air flow into the engine for combustion in said chamber; a first total head tube carried by the aircraft upstream of said shock wave for providing a pressure proportional to the impact pressure of the surrounding air stream at a first point at which the air velocity relative to the aircraft engine is supersonic during supersonic flight; a second total head tube carried by the aircraft downstream of said shock wave for providing a pressure proportional to the impact pressure of said air stream at a different point in said stream at which said relative air velocity is also supersonic during supersonic flight but is lower than that at said first point such that the relative magnitude of said pressures is a measure of the flight speed and such that any increase in the impact pressure at said second point relative to that at said first point indicates an increase in flight speed; means operatively connected to said total head tubes so as to be responsive to the relative magnitude of said pressures for modifying said air flow signal; and engine fuel regulating mechanism including means providing a signal which is a measure of the fuel supply to the engine combustion chamber and including means responsive to said fuel supply signal and to said modified signal for regulating the engine fuel supply so that the fuel-air ratio of the engine combustible mixture decreases and increases with increase and decrease respectively in the impact pressure at said second point relative to that at said first point.

2. Control apparatus for a supersonic aircraft having means for creating a shock wave during supersonic flight and having a propulsive engine with combustion apparatus and with an air inlet for supplying air thereto; said apparatus comprising a first total head tube carried by the aircraft upstream of said shock wave for providing a signal proportional to the impact pressure of the surrounding air stream at a first point at which the air velocity relative to the aircraft engine is supersonic during supersonic flight; a second total head tube carried by the aircraft downstream of said shock wave for providing a signal proportional to the impact pressure of said air stream at a second point different from said first point and at which said relative air velocity is also supersonic during supersonic flight but is lower than the velocity at said first point such that the relative magnitude of said signals is a measure of the flight speed and such that an increase in the impact pressure at said second point relative to that at said first point indicates an increase in flight speed; means providing a fluid flow path having a pair of serially disposed restrictions; means operatively connected to said total head tubes and to one of said restrictions so as to be responsive to changes in the relative magnitude of said pressures for varying said one restriction; means supplying a fluid to said flow path under a pressure which is a measure of the mass rate of air flow into said inlet; and means operatively connected to said flow path at a point intermediate said restrictions so as to be responsive to the pressure at said point for varying the engine fuel supply rate such that the fuel-air ratio of the engine combustible mixture decreases and increases with increase and decrease respectively in the impact pressure at said second point relative to that at said first point.

3. Control apparatus as recited in claim 2 in which one end of said fluid flow path communicates with the air entrance end of said combustion apparatus.

4. Control apparatus for supersonic aircraft having means for creating a shock wave during supersonic flight and having a propulsive engine with means operable to vary the net forward thrust; said apparatus comprising a first fixedly-positioned total head tube carried by the aircraft upstream of said shock wave for providing a signal proportional to the impact pressure of the surrounding air stream at a first point at which the air velocity relative to the aircraft is supersonic during supersonic flight; a second fixedly-positioned total head tube carried by the aircraft downstream of said shock wave for providing a signal proportional to the impact pressure of said air stream at a second point different from said first point and at which said relative air velocity is also supersonic during supersonic flight but is lower than the velocity at said first point such that the relative magnitude of said signals is a measure of the flight speed and such that an increase in the impact pressure at said second point relative to that at said first point indicates an increase in flight speed; and means responsive to changes in the relative magnitude of said signals for effecting operation of aircraft engine thrust varying means to decrease said thrust upon an increase in the impact pressure at said second point relative to that at said first point.

5. Control apparatus for a supersonic aircraft having means for creating a shock wave during supersonic flight and having a propulsive engine with combustion apparatus and with an air inlet for supplying air thereto; said apparatus comprising a first fixedly-positioned total head tube carried by the aircraft upstream of said shock wave for providing a signal proportional to the impact pressure of the surrounding air stream at a first point at which the air velocity relative to the aircraft engine is supersonic during supersonic flight; a second fixedly-positioned total head tube carried by the aircraft downstream of said shock wave for providing a signal proportional to the impact pressure of said air stream at a second point different from said first point and at which said relative air velocity is also supersonic during supersonic flight but is lower than the velocity at said first point such that the relative magnitude of said signals is a measure of the flight speed and such that an increase in the impact pressure at said second point relative to that at said first point indicates an increase in flight speed; and means responsive to changes in the relative magnitude of said signals for varying the engine fuel supply rate such that the engine fuel supply rate decreases and increases with increase and decrease respectively in the impact pressure at said second point relative to that at said first point.

References Cited in the file of this patent

UNITED STATES PATENTS

| | | |
|---|---|---|
| 2,512,790 | Cleveland | June 27, 1950 |
| 2,540,594 | Price | Feb. 6, 1951 |
| 2,566,319 | Deacon | Sept. 4, 1951 |
| 2,642,237 | Page et al. | June 16, 1953 |
| 2,753,686 | Billman | July 10, 1956 |
| 2,796,730 | Lawrence | June 25, 1957 |
| 2,850,871 | Drake | Sept. 9, 1958 |